(12) United States Patent
Minnette

(10) Patent No.: US 9,469,445 B2
(45) Date of Patent: Oct. 18, 2016

(54) PACKAGE WITH LID SEALING SYSTEM

(71) Applicant: Berry Plastics Corporation, Evansville, IN (US)

(72) Inventor: Jeffrey C Minnette, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 717 days.

(21) Appl. No.: 13/661,704

(22) Filed: Oct. 26, 2012

(65) Prior Publication Data
US 2013/0047559 A1   Feb. 28, 2013

Related U.S. Application Data

(63) Continuation-in-part of application No. 13/362,953, filed on Jan. 31, 2012, now Pat. No. 8,998,030.

(60) Provisional application No. 61/440,299, filed on Feb. 7, 2011.

(51) Int. Cl.
   *B65D 43/02*   (2006.01)
   *B65B 55/24*   (2006.01)
   *B65B 7/28*    (2006.01)

(52) U.S. Cl.
   CPC ........... *B65D 43/0212* (2013.01); *B65B 7/285* (2013.01); *B65B 55/24* (2013.01); *B65D 2543/0024* (2013.01); *B65D 2543/0037* (2013.01); *B65D 2543/0074* (2013.01); *B65D 2543/00092* (2013.01); *B65D 2543/00296* (2013.01); *B65D 2543/00314* (2013.01); *B65D 2543/00425* (2013.01); *B65D 2543/00537* (2013.01); *B65D 2543/00629* (2013.01); *B65D 2543/00685* (2013.01); *B65D 2543/00796* (2013.01)

(58) Field of Classification Search
   CPC ................ B65D 43/0212; B65D 2543/00092; B65D 2543/0024; B65D 2543/00296; B65D 2543/00314; B65D 2543/0037; B65D 2543/00796; B65B 7/285; B65B 55/24
   See application file for complete search history.

(56) References Cited

U.S. PATENT DOCUMENTS

| | | | | |
|---|---|---|---|---|
| 2,614,727 A | * | 10/1952 | Robinson | 220/780 |
| 2,772,013 A | * | 11/1956 | Stover | 215/260 |
| 2,901,140 A | * | 8/1959 | Robinson | 215/277 |
| 3,276,616 A | | 10/1966 | Lurie | |
| 3,834,606 A | | 9/1974 | Andersson | |
| 3,913,785 A | * | 10/1975 | Pattershall | 220/733 |
| 3,934,749 A | | 1/1976 | Andrulionis | |

(Continued)

FOREIGN PATENT DOCUMENTS

| | | |
|---|---|---|
| EP | 0536137 | 4/1993 |
| EP | 1930253 | 2/2011 |
| FR | 2827841 | 1/2003 |

OTHER PUBLICATIONS

International Search Report and Written Opinion dated Sep. 4, 2014, relating to International Application No. PCT/US2014/035837.

(Continued)

*Primary Examiner* — Sameh Tawfik
(74) *Attorney, Agent, or Firm* — Barnes & Thornburg LLP

(57) ABSTRACT

A package includes a container and a lid adapted to mate with a brim of the container. The lid closes a top opening in the container when mounted on the container.

15 Claims, 10 Drawing Sheets

(56) References Cited

U.S. PATENT DOCUMENTS

| | | |
|---|---|---|
| 3,938,686 A | 2/1976 | Milligan |
| 3,956,550 A | 5/1976 | Sutch |
| 4,044,941 A * | 8/1977 | Knudsen .................. 220/258.3 |
| 4,109,815 A | 8/1978 | Collins, III |
| 4,111,330 A | 9/1978 | Jordan |
| 4,141,463 A | 2/1979 | Smith |
| 4,171,084 A | 10/1979 | Smith |
| 4,192,434 A | 3/1980 | Conroy |
| 4,209,107 A | 6/1980 | Crisci |
| 4,215,797 A | 8/1980 | Chen |
| 4,238,047 A | 12/1980 | Helms et al. |
| 4,252,248 A | 2/1981 | Obrist et al. |
| 4,258,529 A | 3/1981 | Smith |
| 4,349,119 A * | 9/1982 | Letica .......................... 220/790 |
| 4,356,930 A * | 11/1982 | Roper .......................... 220/783 |
| 4,397,133 A | 8/1983 | Hume |
| 4,418,834 A | 12/1983 | Helms et al. |
| 4,438,864 A | 3/1984 | Helms |
| 4,442,971 A | 4/1984 | Helms |
| 4,448,345 A | 5/1984 | Helms |
| 4,495,749 A | 1/1985 | Faller |
| 4,533,063 A | 8/1985 | Buchner |
| 4,595,117 A | 6/1986 | Walter |
| 4,685,273 A | 8/1987 | Caner |
| 4,692,132 A * | 9/1987 | Ikushima et al. ............ 493/103 |
| 4,738,374 A | 4/1988 | Ingemann |
| 4,838,008 A | 6/1989 | Hardy |
| 5,039,001 A | 8/1991 | Kinigakis |
| 5,091,231 A | 2/1992 | Parkinson |
| 5,097,107 A | 3/1992 | Watkins et al. |
| 5,098,751 A | 3/1992 | Tamura |
| 5,174,460 A | 12/1992 | Minnette |
| 5,178,297 A | 1/1993 | Harold |
| 5,246,134 A | 9/1993 | Roth et al. |
| 5,248,134 A | 9/1993 | Ferguson et al. |
| 5,258,191 A | 11/1993 | Hayes |
| 5,377,873 A | 1/1995 | Minnette |
| 5,385,255 A * | 1/1995 | Varano et al. ................ 229/404 |
| 5,395,005 A | 3/1995 | Yoshida |
| 5,428,209 A | 6/1995 | Babu et al. |
| 5,443,853 A | 8/1995 | Hayes |
| 5,511,679 A | 4/1996 | Beck |
| 5,634,567 A | 6/1997 | Hekal |
| 5,647,501 A | 7/1997 | Helms |
| 5,692,635 A | 12/1997 | Farrell et al. |
| 5,810,197 A | 9/1998 | Mazzarolo |
| 5,911,334 A | 6/1999 | Helms |
| 5,947,278 A | 9/1999 | Sawhney |
| 5,950,861 A | 9/1999 | Roth et al. |
| 5,983,607 A | 11/1999 | Mihalov |
| 6,032,823 A * | 3/2000 | Bacon .......................... 220/620 |
| 6,053,353 A | 4/2000 | Helms |
| 6,145,689 A | 11/2000 | Kobayashi et al. |
| 6,196,451 B1 | 3/2001 | Helms |
| 6,234,386 B1 | 5/2001 | Drummond et al. |
| 6,439,387 B1 | 8/2002 | Bergman |
| 6,508,375 B1 | 1/2003 | Krall |
| 6,523,713 B1 * | 2/2003 | Helms .......................... 220/831 |
| 6,637,176 B1 | 10/2003 | Krall |
| 6,673,303 B2 | 1/2004 | White et al. |
| 6,749,066 B2 | 6/2004 | Bergman |
| 6,772,901 B2 | 8/2004 | Witt |
| 6,799,692 B2 | 10/2004 | Teixeira Alvares |
| 6,857,561 B2 | 2/2005 | Williams et al. |
| 6,881,286 B2 | 4/2005 | Drummond |
| 6,923,017 B2 | 8/2005 | Dais |
| 7,055,713 B2 | 6/2006 | Rea |
| 7,086,545 B2 | 8/2006 | Mannion et al. |
| 7,134,576 B2 * | 11/2006 | Gringer et al. ............... 222/143 |
| 7,267,243 B2 | 9/2007 | Steg |
| 7,311,218 B2 | 12/2007 | Varadarajan |
| 7,584,866 B2 * | 9/2009 | Selina et al. ................. 220/698 |
| 7,694,837 B2 | 4/2010 | Robertson et al. |
| 7,703,626 B2 * | 4/2010 | Witt .............................. 220/276 |
| 7,757,879 B2 | 7/2010 | Schuetz et al. |
| 7,870,967 B2 | 1/2011 | Sawyer |
| 7,938,293 B2 | 5/2011 | Gidumal |
| 7,968,033 B2 | 6/2011 | Mazzarolo |
| 8,245,873 B2 | 8/2012 | Steg |
| 8,770,427 B2 | 7/2014 | Longo |
| 8,991,632 B2 | 3/2015 | Minnette |
| 8,998,030 B2 | 4/2015 | Minnette |
| 9,032,698 B2 | 5/2015 | Minnette |
| 9,067,347 B2 | 6/2015 | Naber |
| 2003/0010787 A1 | 1/2003 | Dalton |
| 2003/0019878 A1 | 1/2003 | Scarabelli |
| 2003/0183636 A1 | 10/2003 | Shih |
| 2004/0065698 A1 * | 4/2004 | Braunstein et al. .......... 222/570 |
| 2004/0159080 A1 | 8/2004 | Stewart |
| 2005/0145632 A1 | 7/2005 | Cocca |
| 2005/0167430 A1 * | 8/2005 | Varadarajan ................ 220/258.1 |
| 2006/0278603 A1 | 12/2006 | Takashima et al. |
| 2007/0108216 A1 | 5/2007 | Kurth et al. |
| 2007/0187352 A1 | 8/2007 | Kras |
| 2007/0205196 A1 * | 9/2007 | Burney et al. ............... 220/276 |
| 2008/0110896 A1 | 5/2008 | Westphal |
| 2008/0264961 A1 | 10/2008 | Sawyer |
| 2009/0032534 A1 | 2/2009 | Luburic |
| 2009/0032535 A1 | 2/2009 | Dunwoody |
| 2009/0302040 A1 | 12/2009 | Fox |
| 2010/0096388 A1 | 4/2010 | Kobayashi et al. |
| 2010/0140282 A1 * | 6/2010 | Steg ............................. 220/780 |
| 2011/0100990 A1 | 5/2011 | Clodfelter et al. |
| 2012/0199599 A1 | 8/2012 | Minnette et al. |
| 2012/0234835 A1 | 9/2012 | Minnette |
| 2012/0270167 A1 | 10/2012 | Sato |
| 2012/0305560 A1 | 12/2012 | Minnette |
| 2013/0008904 A1 | 1/2013 | Minnette et al. |
| 2013/0032598 A1 | 2/2013 | Triquet |
| 2013/0047559 A1 | 2/2013 | Minnette |
| 2013/0104505 A1 | 5/2013 | Minnette |
| 2013/0112690 A1 | 5/2013 | Jongsma |
| 2013/0153577 A1 | 6/2013 | Su |
| 2013/0292394 A1 | 11/2013 | Minnette |
| 2014/0116977 A1 | 5/2014 | Minnette |
| 2014/0117025 A1 | 5/2014 | Minnette |
| 2014/0215974 A1 | 8/2014 | Minnette |
| 2014/0262916 A1 | 9/2014 | Minnette |
| 2014/0326735 A1 | 11/2014 | Minnette |
| 2015/0203263 A1 | 7/2015 | Minnette |
| 2016/0023820 A1 | 1/2016 | Minnette |

OTHER PUBLICATIONS

European Search Report for Appl. No. 12745363.7 dated Jun. 20, 2014.
International Search Report and Written Opinion dated Apr. 14, 2014, relating to International Application No. PCT/US2013/070273.
International Search Report dated Jun. 20, 2012, for PCT/US2012/28010, ten pages.
International Search Report dated May 11, 2012, for PCT/US2012/023639, nine pages.
International Search Report dated Sep. 28, 2012, for PCT/US2012/045965, seven pages.
Office action dated Aug. 29, 2013 for U.S. Appl. No. 13/362,953.
Office action dated Feb. 27, 2014 for U.S. Appl. No. 13/362,953.
Office Action dated Jun. 9, 2014 for U.S. Appl. No. 13/544,753.
PCT International Search Report and Written Opinion completed by the ISA/US on Mar. 19, 2015 and issued in connection with PCT/US2015/012497.
English summary of Mexican Office Action issued in connection to Mexican Patent Application No. MX/a/2013/008849, mailed Sep. 22, 2015, 4 pages.
Office Action dated Mar. 21, 2016 for U.S. Appl. No. 14/603,083.
International Search Report and Written Opinion dated Dec. 22, 2015, relating to International Application No. PCT/US2015/041784.
Office Action dated Mar. 28, 2016 for U.S. Appl. No. 14/264,512.

* cited by examiner

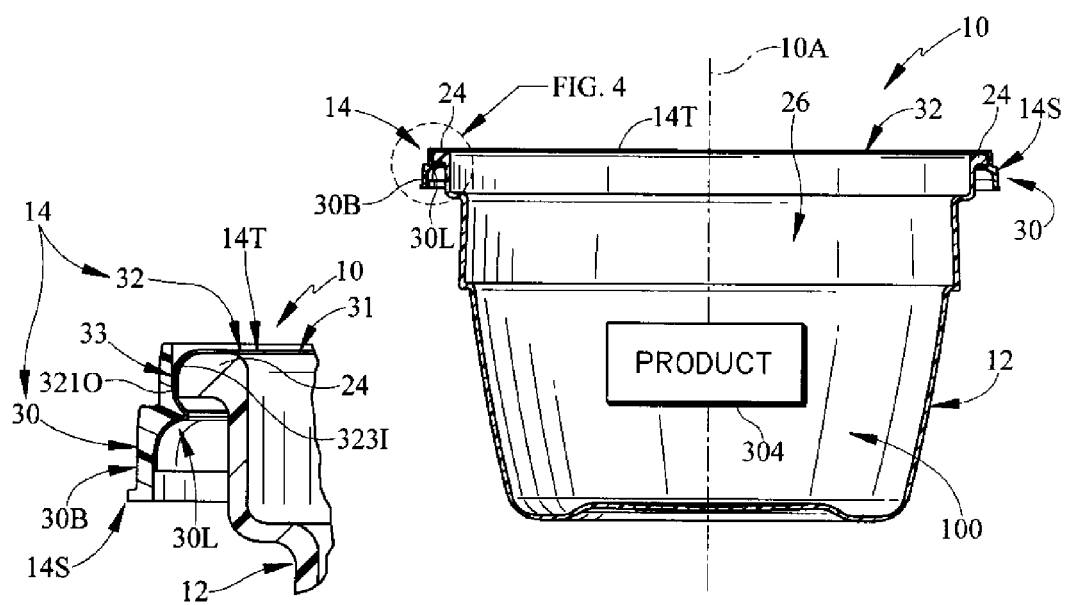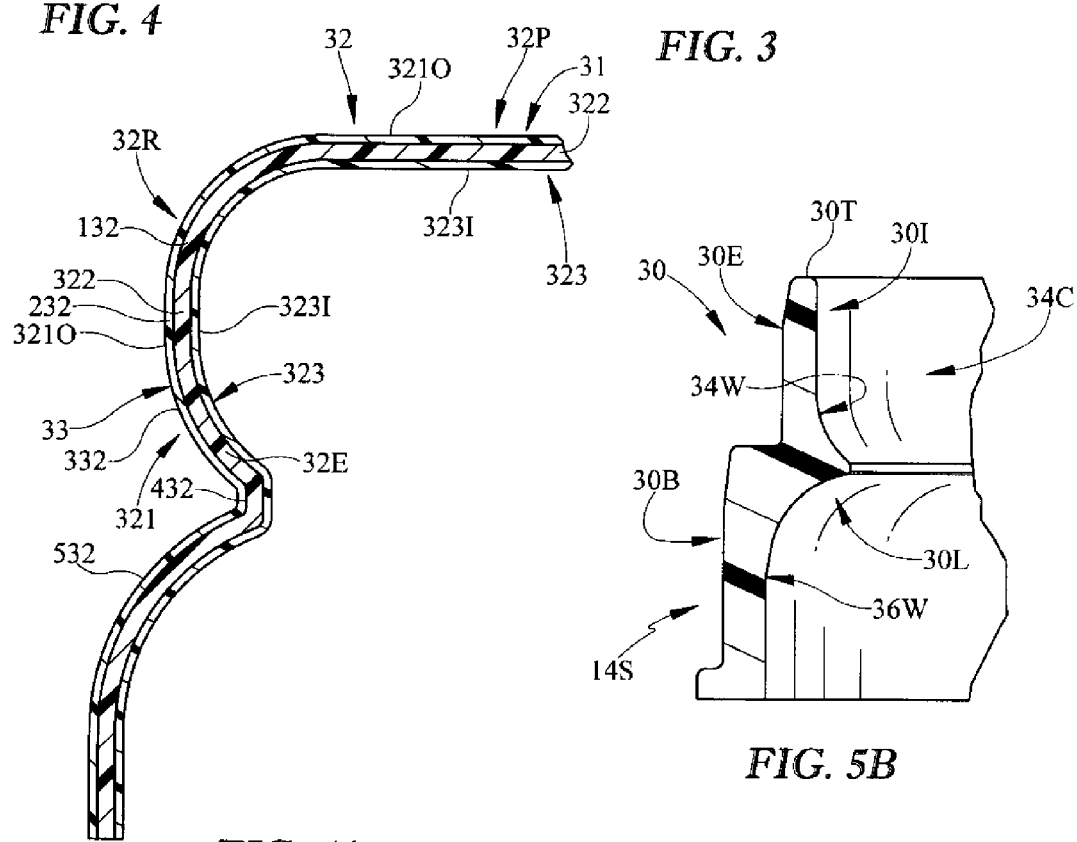

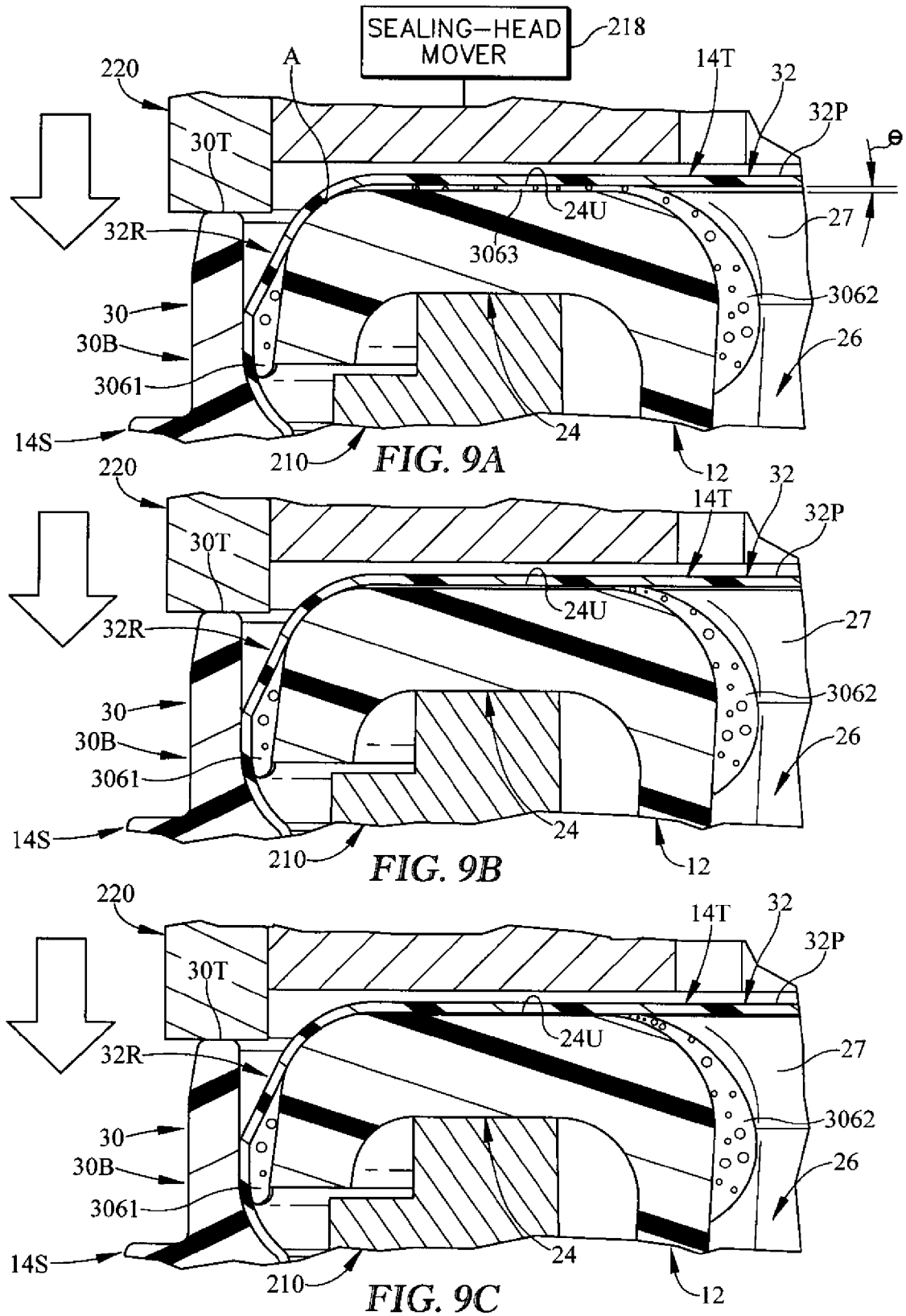

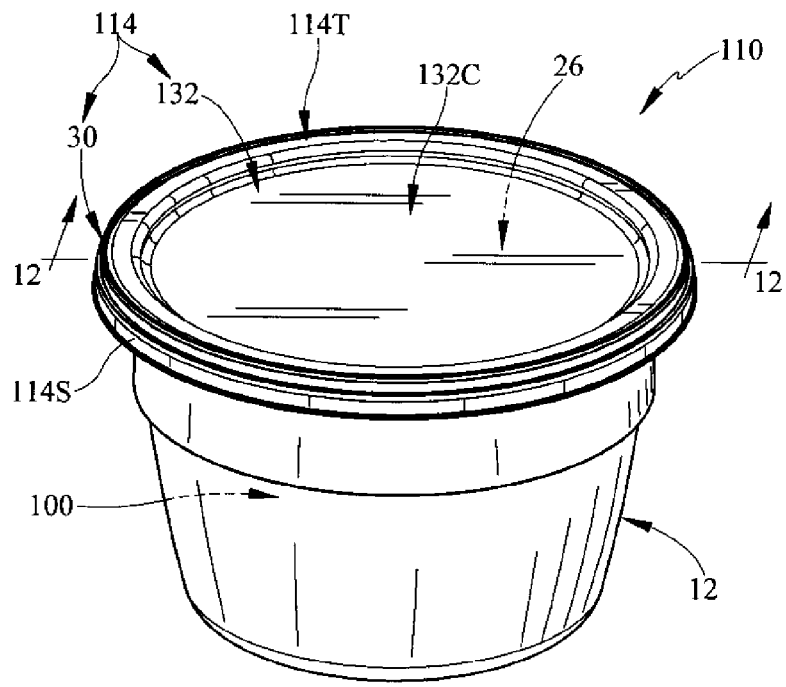
FIG. 11
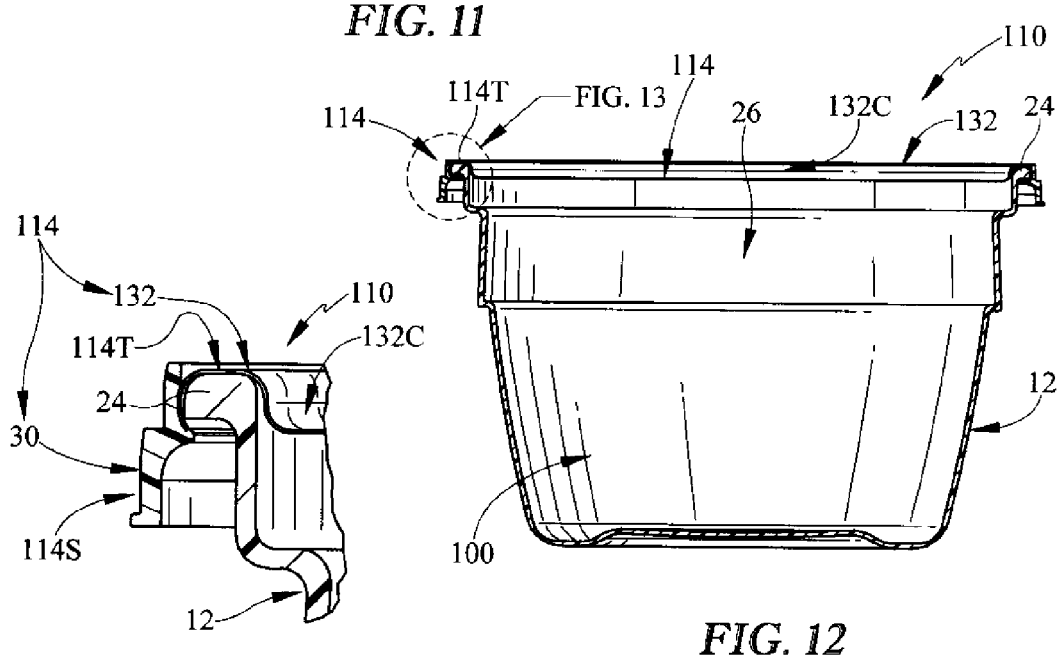
FIG. 12
FIG. 13

PACKAGE WITH LID SEALING SYSTEM

PRIORITY CLAIM

This application is a continuation-in-part of U.S. application Ser. No. 13/362,953, filed Jan. 31, 2012, which claims priority under 35 U.S.C. §119(e) to U.S. Provisional Application Ser. No. 61/440,299, filed Feb. 7, 2011, both of which are expressly incorporated by reference herein.

BACKGROUND

The present disclosure relates to a package, and particularly to a package including a container and a system for sealing a closure for the container. More particularly, the present disclosure relates to a process for mounting the closure on a brim of a container filled with a product and moved on a conveyor included in a container filling and closing line at a factory.

SUMMARY

A package in accordance with the present disclosure includes a lid adapted to mate with a brim of a container to close an opening into an interior product-storage region formed in the container. In illustrative embodiments, the package is configured to store food in the product-storage region formed in the container.

In illustrative embodiments, the lid has an elastic top wall made of an elastic material and a side wall coupled to a peripheral portion of the top wall and configured to be coupled to the brim of the container. The elastic top wall comprises a membrane sheet made of a plastics material.

In an illustrative lid-coupling process in accordance with the present disclosure, a product (such as food) is discharged into an interior product-storage region formed in the container, then the elastic top wall of the lid is mated with a portion of the container brim and stretched as the lid is moved downwardly relative to the container under a force applied by a moving sealing head during coupling of the lid to the container. During such a stretching step, the elastic top wall is moved along the container brim to establish a brim-wiping motion to cause substantially all of any spilled product located on the annular brim to be displaced and wiped off of the container brim so that little, if any, spilled product remains on the container brim and the surface area of the elastic top wall of the lid that mates with the underlying container brim is maximized.

In an illustrative lid-coupling process in accordance with the present disclosure, the elastic top wall of the lid is heated by a heater included in the movable sealing head that is used to couple the lid to the container brim. Sufficient heat is transferred to the elastic top wall of the lid to establish a chemical-bond sealed connection between the elastic top wall of the lid and an upwardly facing surface of the container brim. The chemical-bond sealed connection between the top wall of the lid and the container brim will be broken the first time the lid is removed from the container by a consumer. After that, the consumer can couple the lid to the container to create a temporary sealing connection between the side wall of the lid and the brim of the container.

In an illustrative process, the heat applied to the elastic top wall of the lid is high enough to cause any residual spilled product that may remain in a space provided on the container brim under the elastic top wall after exposure to the wiping action of the stretching elastic top wall to be gasified. The gasified residual spilled product will pass as a gas through the elastic top wall of the lid into the surroundings so that no spilled product remains on the container brim.

In some illustrative embodiments, the lid comprises a membrane sheet configured to provide the top wall of the lid and a sheet-support ring coupled permanently to the entire peripheral perimeter edge of the membrane sheet and configured to provide the side wall of the lid. The sheet-support ring is configured to mate with the brim of the container in any suitable way to retain the membrane sheet in mating and sealing engagement with the container brim so that the opening into the product-storage region formed in the container is closed while the lid remains in place on the container.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is a sectional view taken along line 3-3 of FIG. 2C showing the lid coupled to the brim of the container;

FIG. 4 is an enlarged partial sectional view taken from a circled region of FIG. 3 showing an annular lid-retention lug that is coupled to the side wall of the sheet-support ring and arranged to extend inwardly into an outwardly opening undercut space defined by the container brim to lie under a downwardly facing surface of the container brim to retain a portion of the membrane sheet of the lid in a stationary position in sealing engagement with the container brim;

FIG. 5A is an enlarged sectional view taken along line 5A-5A of FIG. 2A providing a diagrammatic cross-sectional view of a portion of the membrane sheet included in the lid and showing that the membrane sheet is multi-layered and comprises, in series, top to bottom (or left to right), an outer bed comprising an aggressive sealant layer adapted to adhere permanently to the sheet-support ring, a core comprising a polypropylene layer, and an inner bed comprising a peelable and resealable sealant layer adapted to bond chemically to the container brim when the top of the lid is heated by the lid heater included in the sealing head to establish the chemical-bond sealed connection between the top of the lid and the container brim;

FIG. 5B is an enlarged sectional view taken along line 5B-5B of FIG. 2A showing that the sheet-support ring includes an annular band and an inwardly extending annular lid-retention lug coupled to the annular band and showing that an upper portion of the annular band, the inwardly extending annular lid-retention lug, and a lower portion of the annular band cooperate to define an inner surface that is arranged to mate with an outer bed (e.g., non-peelable aggressive sealant layer) of a multi-layer membrane sheet (as suggested in FIGS. 6 and 7) to retain the membrane sheet permanently in a mounted position on the sheet-support ring;

FIG. 8A shows the lid in a first engaged position on the container brim during a lid-mounting step at a factory and showing that some of the food that was discharged toward the interior product-storage region formed in the container during an earlier container filling step (see, for example, STEP 2 in FIG. 1) has landed on the brim of the container to form a mound of spilled food;

FIG. 8B shows the downwardly moving lid in a subsequent second engaged position on the container brim and showing that the mound of spilled food on the container brim has been compressed between the membrane sheet of the lid and the brim of the container as a result of downward movement of the lid relative to the container brim;

FIG. 8C shows the downwardly moving lid in a subsequent third engaged position on the container brim and showing further compression of the mound of spilled food between the membrane sheet of the lid and the brim of the container;

FIG. 8D shows the downwardly moving lid in a subsequent fourth engaged (coupled) position on the brim of the container to establish a mechanical coupling between the lid and the container brim and suggesting that a small first portion of the mound of spilled food located on the upwardly facing surface of the container brim has been pushed radially outwardly to lie along an outer side wall of the container brim, a relatively larger second portion of the mount of spilled food located on the container brim has been pushed radially inwardly into the interior product-storage region of the container, and a remaining third portion of the mound of spilled food remains on the upwardly facing surface of the container brim to provide a relatively thin layer of spilled food on the container brim;

FIGS. 9A-9C show an illustrative process of wiping (i.e., squeegeing) the remaining thin layer of spilled food from the upwardly facing surface of the container brim in response to further downward movement of the lid relative to the container to remove substantially all spilled food from the container brim and thereby increase the surface contact area of the membrane sheet of the lid on the brim of the container;

FIG. 9A shows the downwardly moving lid in a subsequent fifth engaged position on the brim of the container to stretch the membrane sheet further to displace some of the thin layer of spilled food remaining on the upwardly facing surface of the container brim and move it in a radially inward direction into the interior product-storage region of the container to increase the surface contact area between the membrane sheet and the container brim;

FIG. 9B shows further stretching of the membrane sheet as the downwardly moving lid reaches a subsequent sixth engaged position on the container brim to displace more spilled food and moved that displaced food into the interior product-storage region of the container to increase further the surface contact area between the membrane sheet and the container brim;

FIG. 9C shows still more stretching of the membrane sheet as the downwardly moving lid reaches a subsequent seventh engaged position on the container brim to displace substantially all of the spilled food to increase still further the surface contact area between the membrane sheet and the container brim;

FIGS. 11-13 show a package in accordance with another embodiment of the present disclosure in which the membrane sheet of the lid is formed to include an upwardly opening concave center portion and is configured to be coupled to an annular brim of a companion container in accordance with the process disclosed herein;

FIG. 11 is a perspective view of a package in accordance with the present disclosure and showing that the package includes a container and a lid mounted on the container and made of a multi-layer membrane sheet and a surrounding sheet-support ring;

FIG. 12 is a sectional view taken along line 12-12 of FIG. 11 showing mating engagement of the lid on the brim of the container so that a perimeter portion of the multi-layer membrane sheet is trapped between an inner perimeter surface of the sheet-support ring and an outer perimeter surface of the container brim to retain product stored in the product-storage region of the container in a sealed chamber when the lid is mounted on the container; and FIG. 13 is an enlarged partial sectional view taken from a circled region of FIG. 12 showing the perimeter portion of the multi-layer membrane sheet seated in an annular interior channel formed in a side wall of the sheet-support ring and arranged to terminate at a perimeter edge formed in an annular lid-retention lug that is coupled to the side wall of the sheet-support ring and arranged to extend inwardly into an outwardly opening undercut space defined by the container brim to engage a downwardly facing surface of the container brim to retain the perimeter portion of the membrane sheet in a stationary position in sealing engagement with the container brim.

DETAILED DESCRIPTION

Figure 1:
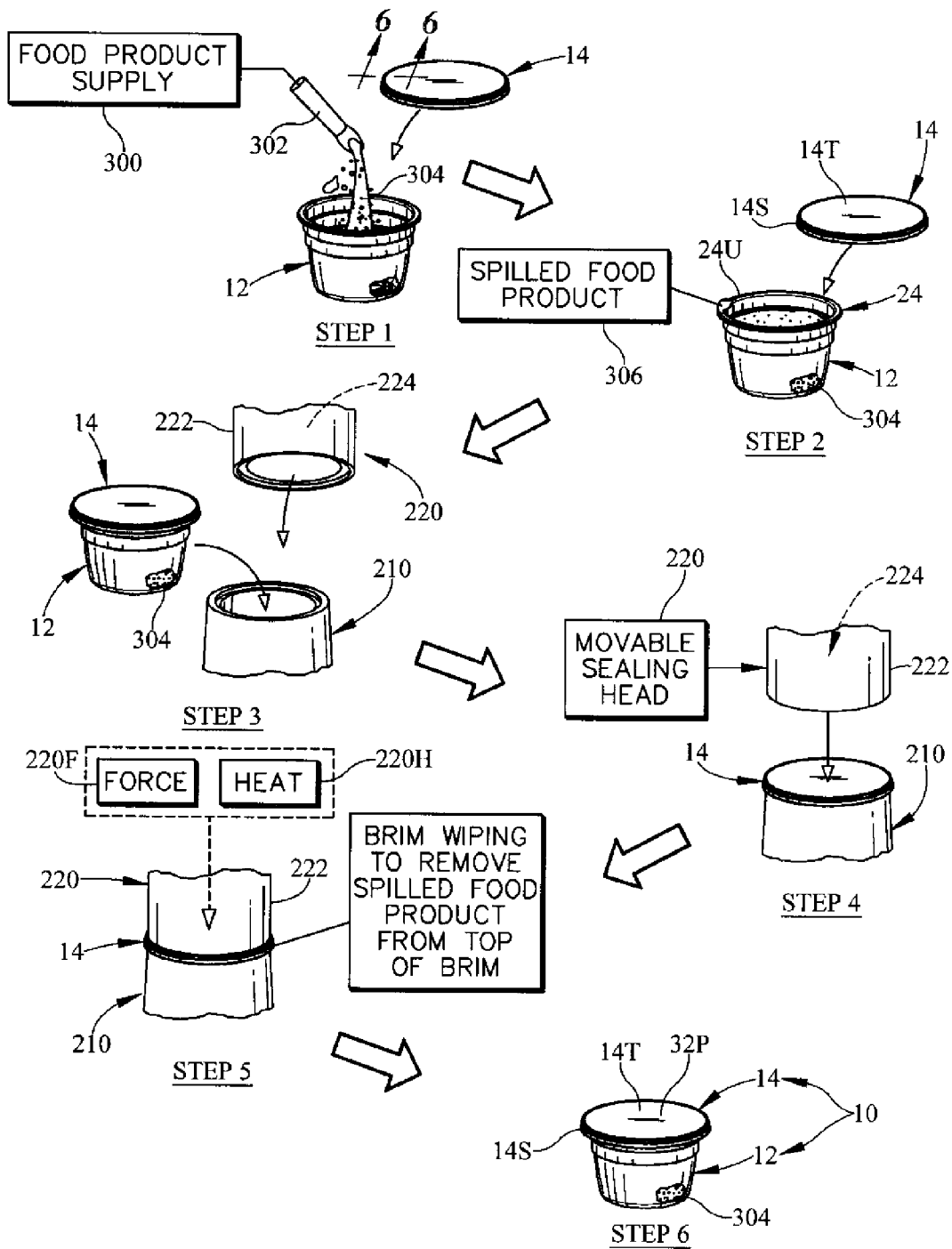
FIG. 1 shows an illustrative container filling and closing process in accordance with the present disclosure in which a container is moved on a conveyor in a factory and suggesting that the process includes the steps of: (1) filling the container with food; (2) placing a lid on the brim of the container; (3) placing the lid and container in a container-receiving support fixture arranged to lie under a movable sealing head; (4) moving the sealing head downwardly to engage the lid; (5) using the sealing head to apply downward force to the lid as the lid engages the brim of the container to couple the lid mechanically to the container brim as suggested in FIGS. 8A-8D and to wipe spilled food off the brim of the container while the lid remains coupled to the container brim as shown, for example, in FIGS. 9A-9C and using a heater provided in the sealing head to apply heat to the top of the lid while the lid remains mechanically coupled to the container brim to establish a chemical-bond sealed connection therebetween as suggested in FIG. 10; and (6) discharging a sealed package configured to be delivered to a consumer as shown in FIG. 10.

A lid 14 is coupled to a brim 24 of a container 12 using downwardly directed force 220F and heat 220H to provide a package 10 in a sequence of illustrative steps shown, for example, in FIG. 1. A top wall 14T of lid 14 is moved by a movable sealing head 220 in a container filling and closing process as suggested diagrammatically in STEP 5 of FIG. 1 and in FIGS. 9A-9C to wipe any spilled product 306 (e.g., food) that was deposited inadvertently on the container brim 24 during filling of container 12 as suggested in STEPS 1 and 2 of FIG. 1 off container brim 24 to maximize mating contact between an inner surface 323I of top wall 14T of lid 14 and an upwardly facing surface 24U of container brim 24.

Figure 10:
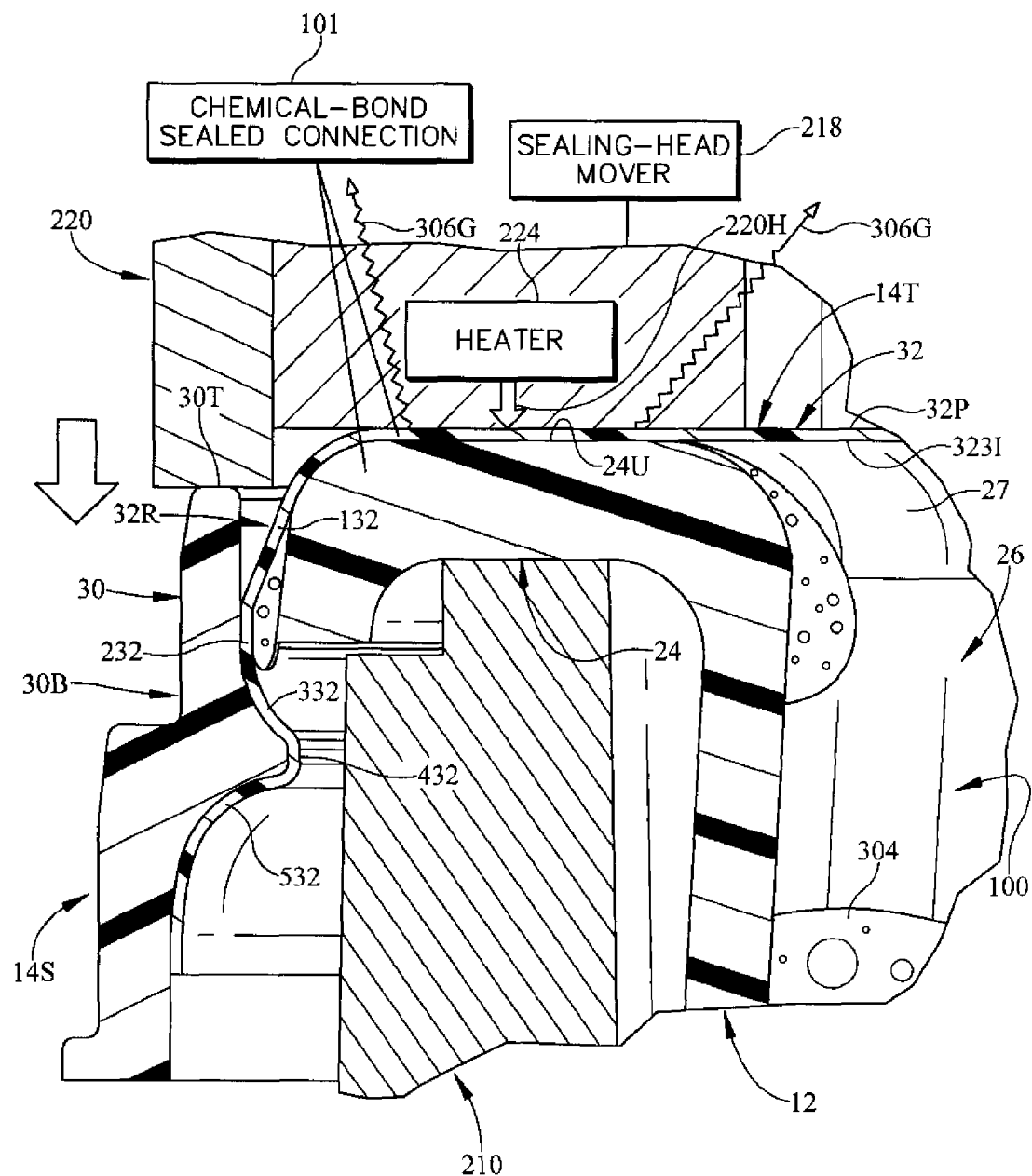
FIG. 10 shows that a heater provided in the sealing head has been activated to heat the stretched membrane sheet to establish a chemical-bond seal between the stretched membrane sheet included in the top of the lid and underlying portions of the container brim and shows diagrammatically that any minute quantity of residual spilled food left on the upwardly facing surface of the brim is gasified during exposure of the stretched membrane sheet to heat from the heater and passed as a gas through the membrane sheet to the surroundings.

A heater 224 provided in movable sealing head 220 is operated to apply heat 220H to the top wall 14T of lid 14 as suggested in STEP 5 of FIG. 1 and FIG. 10 while lid 14 is coupled mechanically to container brim 24. This applied heat 220H is sufficient to establish a chemical-bond sealed connection 101 between top wall 14T of lid 14 and container brim 24 at a container filling and closing factory as suggested in FIG. 10. This chemical-bond sealed connection will be broken the first time a consumer removes lid 14 from container 12. In illustrative embodiments, the applied heat 220H is high enough to cause any minute quantity of residual spilled product 306 extant on container brim 24 and located in a space provided between top wall 14T of lid 14 and container brim 24 to be gasified and pass as a gas 306G through top wall 14T of lid 14 into the surroundings as suggested diagrammatically in FIG. 10 so that no spilled product 306 remains on container brim 24.

An illustrative container filling and closing process is shown in FIG. 1. In STEP 1, a product 304 such as food is discharged from a food product supply 300 through a dispenser 302 into an interior product-storage region 26 formed in container 12 before lid 14 is coupled to brim 24 of container 12. In STEP 2, it can be seen that some of food product 304 landed inadvertently on container brim 24 during STEP 1 to provide a mound of spilled product 306 on container brim 24. In STEP 3, the filled and lidded container 12 is placed in a container-receiving support fixture 210 that is arranged to lie under a movable sealing head 220 comprising a lid pusher 222 and heater 224 as suggested in FIG. 2B. It is within the scope of this disclosure to place container 12 in container-receiving support fixture 210 before STEP 1.

In STEP 4, the movable sealing head 220 is moved downwardly to cause lid pusher 222 to engage lid 14 while lid 14 is at rest on container brim 24. In STEP 5, lid pusher 222 of movable sealing head 220 is moved by a sealing head mover 218 to apply downwardly directed force 220F to lid 14 as lid 14 engages container brim 24 to couple lid 14 mechanically to container brim 24 as suggested in FIGS. 8A-8D. In STEP 5, a heater 224 provided in movable sealing head 220 is used to apply downwardly directed heat 220H to top wall 14T of lid 14 while lid 14 remains mechanically coupled to container brim 24 as suggested in FIG. 10 to establish a chemical-bond sealed connection 101 between top wall 14T of lid 14 and container brim 24. In STEP 6, a sealed package 10 comprising container 12 and lid 14 is presented and ready to be delivered to a buyer.

A package 10 in accordance with the present disclosure includes a container 12 and a lid 14 configured to mate with container 12 to close an opening 27 into an interior product-storage region 26 formed in container 12 as suggested in FIGS. 1-4. Lid 14 comprises a side wall 14S defined by a sheet-support ring 30 configured to mate with annular brim 24 of container 12 as suggested in FIGS. 2-4 and a top wall 14T included in membrane sheet 32 that is coupled permanently to the sheet-support ring 30 to move therewith whenever lid 14 is moved relative to container brim 24. A center plate 32P included in membrane sheet 32 is heated by heat 220H generated by heater 224 to establish the chemical-bond sealed connection 101 between top wall 14T of lid 14 and container brim 24 as suggested in FIG. 7 during a lid-heating step included in the container filling and closing process in accordance with the present disclosure as suggested in FIGS. 1 and 10. This chemical-bond sealed connection 101 is broken the first time that lid 14 is removed from container 12 by a consumer. Membrane sheet 32 is a barrier material that is configured to mate temporarily and repeatedly with container brim 24 to establish a fluid seal therebetween whenever lid 14 is later mounted on container brim 24 by the consumer.

Figure 7:
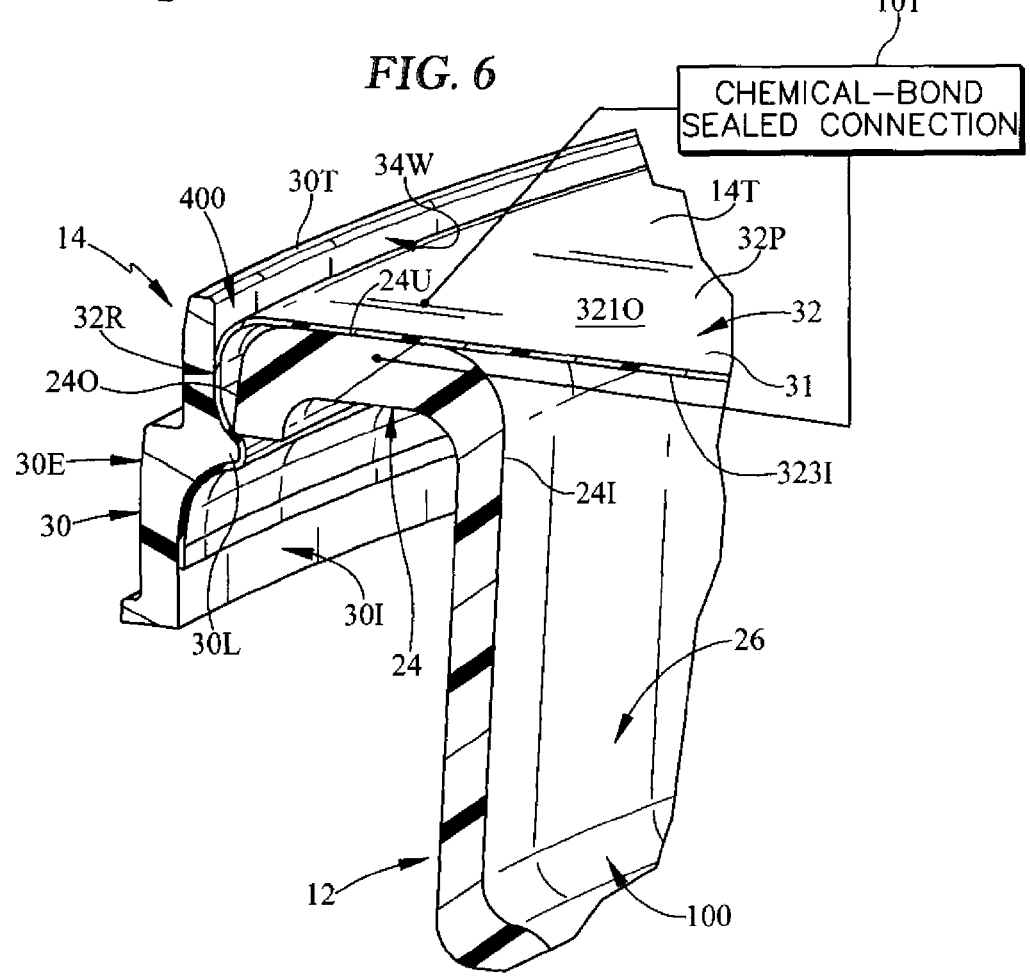
FIG. 7 is a view similar to FIG. 6 and taken along line 7-7 of FIG. 2C after the lid is mounted on the brim of container showing (1) mating engagement of a portion of an inner bed of the multi-layer membrane sheet and the outer perimeter surface of the container brim when the annular lid-retention lug is arranged to extend under the container brim and (2) mating engagement of a horizontally extending peripheral portion of the inner bed of the multi-layer membrane sheet and an annular upwardly facing surface of the container brim (after the lid was heated as disclosed herein) to establish a chemical-bond sealed connection between the top of the lid and the brim of the container.

In illustrative embodiments, membrane sheet 32 provides a barrier lidstock and is anchored to the surrounding sheet-support ring 30 to form lid 14 as suggested in FIGS. 5A and 7. It is within the scope of this disclosure to use insert-molding techniques to overmold sheet-support ring 30 onto the multi-layer membrane sheet 32 to form lid 14. In illustrative embodiments, membrane sheet 32 is bonded permanently to sheet-support ring 30.

Figure 6:
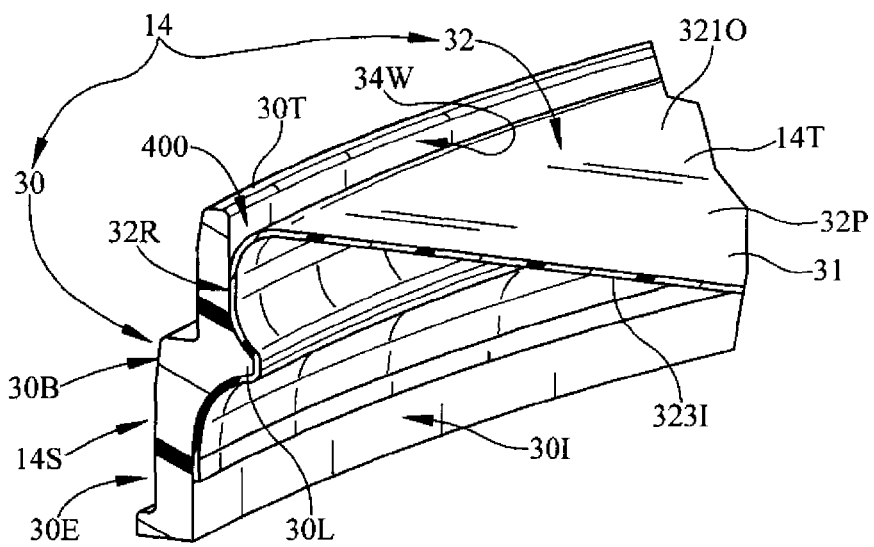
FIG. 6 is an enlarged perspective view of a section of the lid taken along line 6-6 in FIG. 1 showing that the membrane sheet is mounted permanently to an inner surface of the annular sheet-support ring to form the lid.

Sheet-support ring 30 provides a lid-ring frame for the multi-layer membrane sheet 32 as suggested in FIGS. 4 and 6. In an illustrative embodiment, sheet-support ring 30 is configured to mate temporarily in snapping relation with a portion of container brim 24 overlying an outwardly extending undercut space formed in container 12 so that container lid 14 is removable and reclosable as suggested in FIGS. 4 and 7.

Membrane sheet 32 is mounted permanently to an inner surface 30I of the annular sheet-support ring 30 to form lid 14 as shown in FIG. 6. As suggested in FIG. 7 after lid 14 is mounted on brim 24 of container 12 there is: (1) mating engagement of a portion of membrane sheet 32 and an outer peripheral portion 24O of container brim 24 when an annular lid-retention lug 30L is arranged to extend under the container brim 24 and (2) mating engagement of a horizontally extending peripheral portion of center plate 32P of membrane sheet 32 and an annular upwardly facing surface 24U of container brim 24 (after lid 14 was heated as disclosed herein) to establish a chemical-bond sealed connection 101 between the top wall 14T of lid 14 and brim 24 of container 12.

An illustrative process for moving lid 14 downwardly using the movable sealing head 220 to establish a mechanical coupling between lid 14 and container brim 24 is shown, for example, in FIGS. 8A-8D. As suggested in FIG. 8A, lid 14 is placed in a first engaged position on container brim 24 during a lid-mounting step at a factory. Some of the food 304 that was discharged through a dispenser 202 toward the interior product-storage region 26 formed in container 12 during an earlier container filling step (see, for example, STEP 2 in FIG. 1) has landed on brim 24 of container 12 to form a mound 306 of spilled food. As suggested in FIG. 8B, the downwardly moving lid 14 has arrived in a subsequent second engaged position on the container brim 24 to cause the mound 306 of spilled food on the container brim 24 to be compressed between membrane sheet 32 of lid 14 and brim 24 of container 12 as a result of downward movement of lid 14 relative to container brim 24. As suggested in FIG. 8C, downwardly moving lid 14 has arrived in a subsequent third engaged position on container brim 24 to cause further compression of the mound 306 of spilled food between membrane sheet 32 of lid 14 and brim 24 of container 12.

Figure 8A:
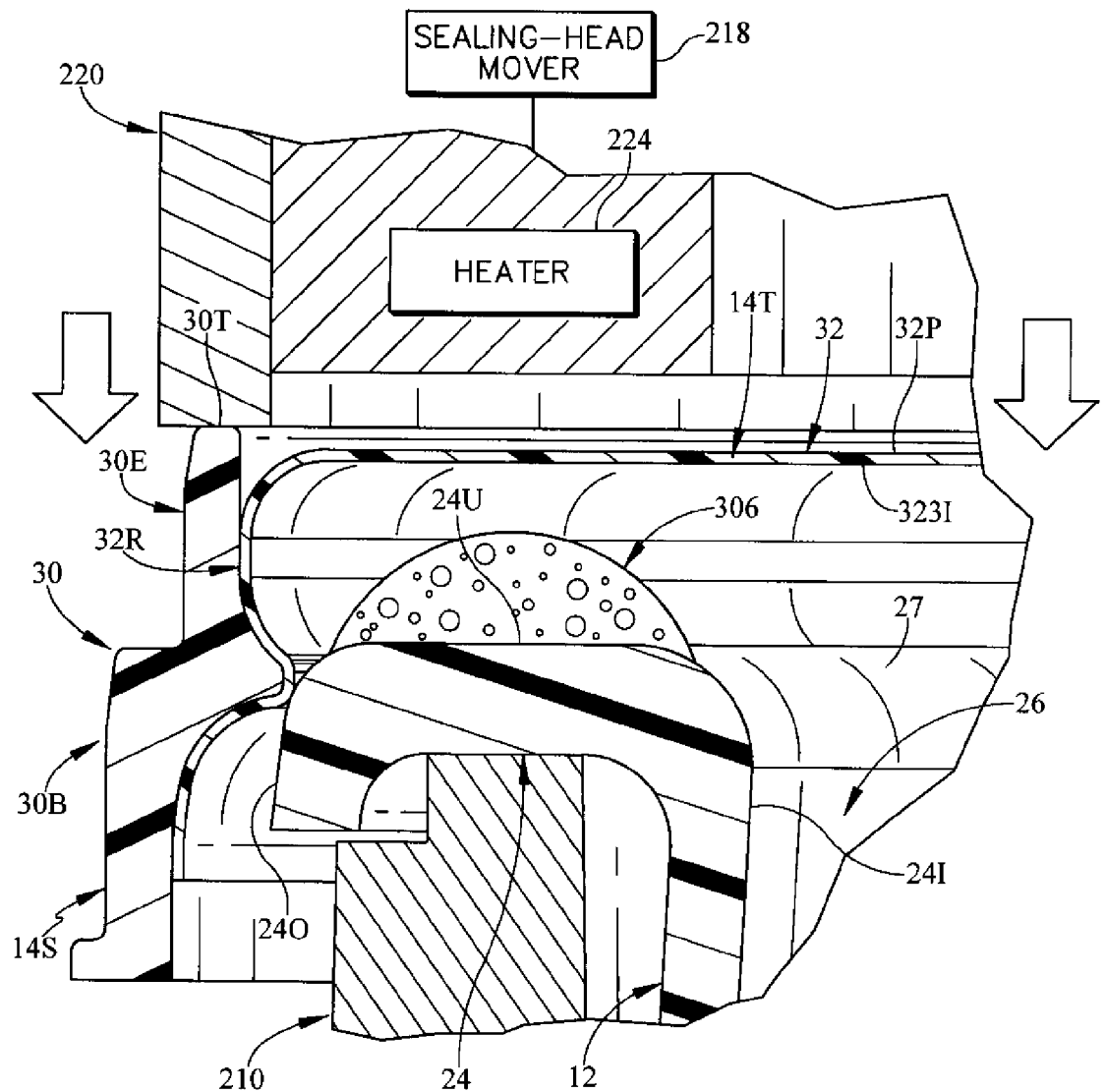
FIGS. 8A-8D show an illustrative process for moving the lid downwardly using the sealing head to establish a mechanical coupling between the lid and the container brim.
Figure 8B:
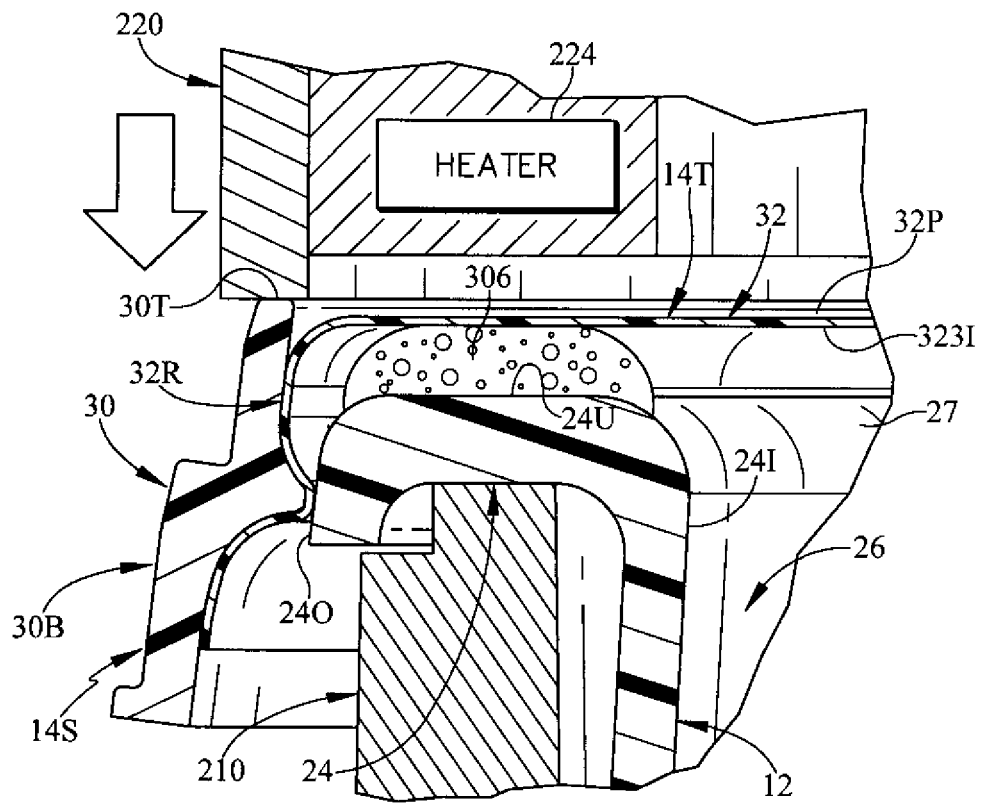
Figure 8C:
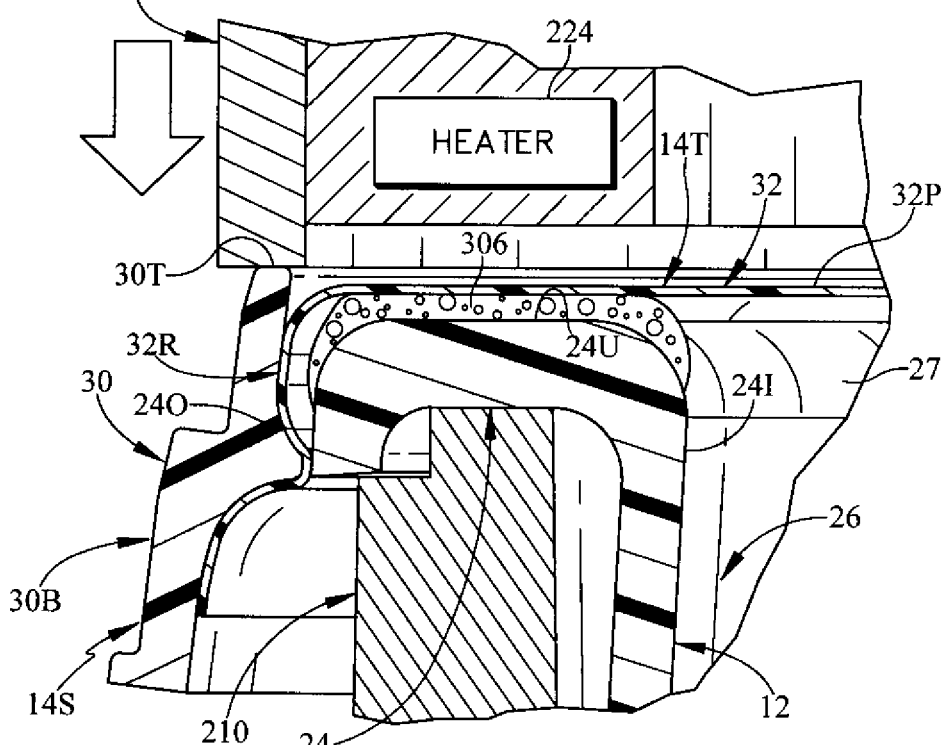
Figure 8D:
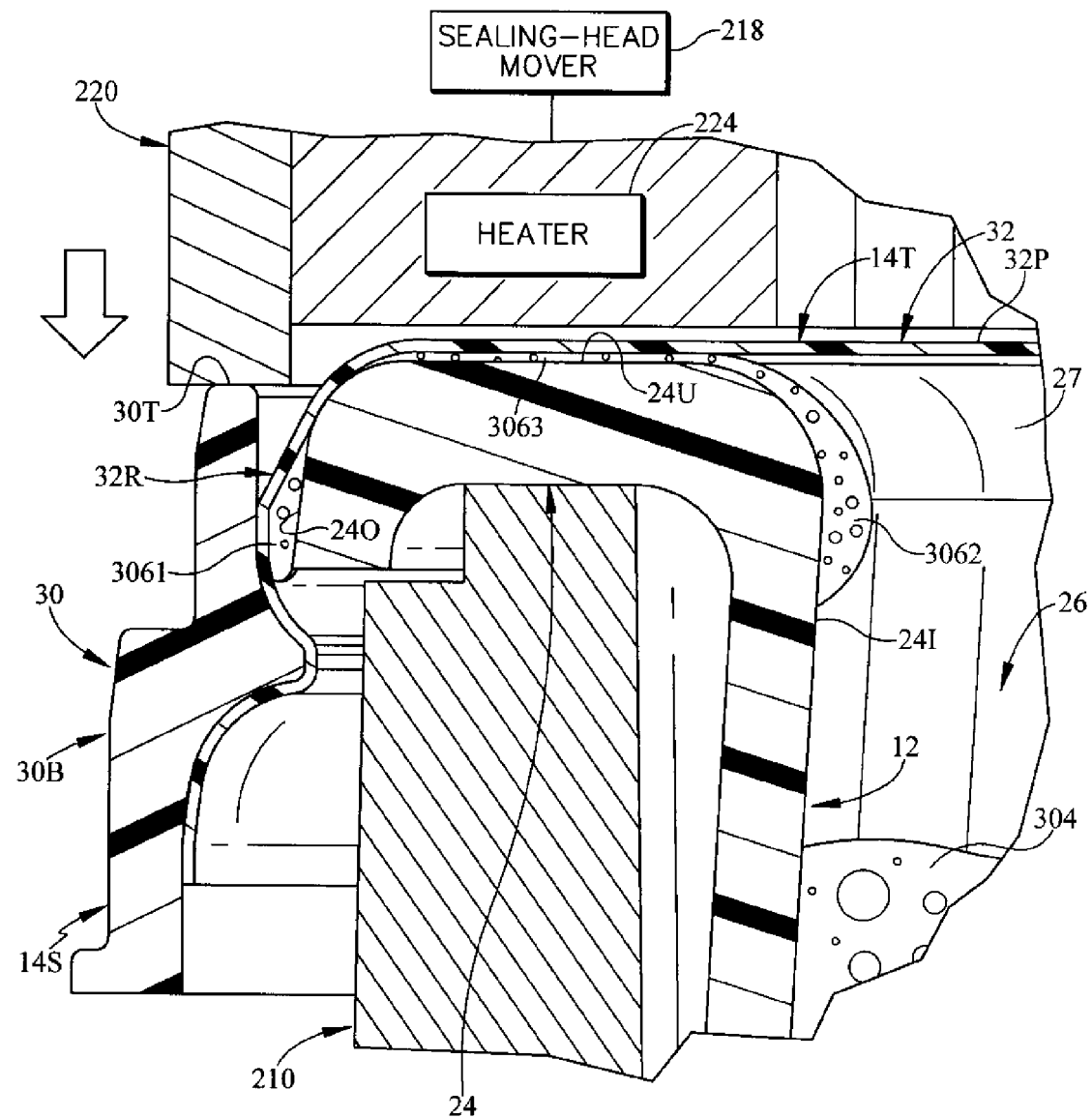

As suggested in FIG. 8D, downwardly moving lid 14 has arrived in a subsequent fourth engaged (coupled) position on brim 24 of container 12 to establish a mechanical coupling between lid 14 and container brim 24. A small first portion 3061 of mound 306 of spilled food located on the upwardly facing surface 24U of container brim 24 has been pushed radially outwardly to lie along an outer side wall 24O of container brim 24. A relatively larger second portion 3062 of the mound 306 of spilled food located on container brim 24 has been pushed radially inwardly into the interior product-storage region 26 of container 12 and may contact an inner side wall 24I of container brim 24. A remaining third portion 3063 of the mound 306 of spilled food remains on the upwardly facing surface 24U of container brim 24 to provide a relatively thin layer 3063 of spilled food 306 on container brim 24.

An illustrative process of wiping (i.e., squeegeing) the remaining thin layer 3063 of spilled food 306 from the upwardly facing surface 24U of container brim 24 in response to further downward movement of lid 14 relative to container 12 is shown, for example, in FIGS. 9A-9C, to remove substantially all spilled food 306 from container brim 24 and thereby increase the surface contact area of membrane sheet 32 of lid 14 on brim 24 of container 12. As suggested in FIG. 9A, the downwardly moving lid 14 has arrived in a subsequent fifth engaged position on brim 24 of container 12 to stretch membrane sheet 32 further to displace some of the thin layer 3063 of spilled food 306 remaining on upwardly facing surface 24U of container brim 24 and move it in a radially inward direction into the interior product-storage region 26 of container 12 to increase the surface contact area between membrane sheet 32 and container brim 24. As suggested in FIG. 9B, further stretching of membrane sheet 32 takes place as the downwardly moving lid 14 reaches a subsequent sixth engaged position on container brim 24 to displace more spilled food 3063 and move that displaced food 3063 into the interior product-storage region 26 of container 12 to increase further the surface contact area between membrane sheet 32 and container brim 24. As suggested in FIG. 9C, still more stretching of membrane sheet 32 takes place as the downwardly moving lid 14 reaches a subsequent seventh engaged position on container brim 24 to displace substantially all of the spilled food 306 to increase still further the surface contact area between membrane sheet 32 and container brim 24.

A heater 224 provided in the movable sealing head 220 has been activated to apply downwardly directed heat 220H to the stretched membrane sheet 32 to establish a chemical-bond sealed connection 101 between the stretched membrane sheet 32 included in the top wall 14T of lid 14 and underlying portions of container brim 24 as suggested in FIG. 10. In illustrative embodiments, any minute quantity of residual spilled food 3063 left on the upwardly facing surface 24U of brim 24 is gasified during exposure of the stretched membrane sheet 32 to downwardly directed heat 220H from the heater 224 and passed as a gas 306G through membrane sheet 32 to the surroundings so that no spilled product 306 remains on container brim 24.

Membrane sheet 32 has multiple layers in accordance with an illustrative embodiment of the present disclosure and comprises an outer bed 321 adapted to carry and exhibit high-quality high-resolution graphics 326 (as suggested in FIG. 2C) and to mate with sheet-support ring 30 as suggested in FIGS. 3 and 4. Membrane sheet 32 also includes an inner bed 323 adapted to bond chemically with container brim 24 when heated and to mate with container brim 24 to establish a fluid seal therebetween each time lid 14 is mounted on container 12 as suggested in FIGS. 3, 4, and 7. Multi-layer membrane sheet 32 also includes a core 322 interposed between and coupled to outer and inner beds 321, 323 as suggested in FIG. 5A.

Inner bed 323 comprises a peelable and resealable sealant layer that in illustrative embodiments is configured to engage container brim 24 to provide means for establishing a fluid seal between lid 14 and container 12 each time the reclosable lid 14 is mated with container brim 24 so that ingress of oxygen and other contaminants into product-storage region 26 formed in container 12 is blocked while lid 14 is mated to container 12. Lid 14 can be removed from container 12 and reclosed in one piece repeatedly by a consumer and still establish a fluid seal between lid 14 and container 12 each time lid 14 is mated to container 12.

Inner bed 323 is made of a composition in accordance with the present disclosure that functions to establish a fluid seal between lid 14 and container brim 24 each time the removable and reclosable lid 14 is mounted on container 12. Thus, sheet-support ring 30 and multi-layer membrane sheet 32 cooperate to create a fluid seal between lid 14 and container 12 that is opened easily by a consumer and that is later resealable.

In a container-filling process in accordance with the present disclosure, a product 304 (e.g., food) is deposited by a dispenser 302 into interior product-storage region 26 formed in container 12 as suggested in FIG. 1. Then lid 14 is mounted on container 12 to close an opening 27 into product-storage region 26 and to cause the peelable and resealable sealant layer established by inner bed 323 in membrane sheet 32 to mate with brim 24 of container 12 so that a mechanical seal is established as suggested in FIGS. 3, 4, 7, and 8D. Then, for example, the peelable and resealable sealant layer established by inner bed 323 included in top wall 14T of lid 14 is welded to container brim 24 using downwardly directed heat 220H applied by heater 224 to inner bed 323 through outer bed 321 and core 322 or other suitable means so that a chemical-bond sealed connection 101 is established. It is within the scope of the present disclosure to couple inner bed 323 of membrane sheet 32 to container brim 24 through heat 220H applied by conduction or transmission of ultrasonic or electromagnetic energy.

A process is provided in accordance with the present disclosure for coupling a lid 14 to a brim 24 of a container 12 to close an opening 27 into an interior product-storage region 26 formed in the container 12 as suggested in FIG. 1. The process comprises the steps of providing a lid 14 having an elastic top wall 14T made of an elastic material and moving the elastic top wall 14T of lid 14 downwardly toward the annular brim 24 of container 12 to cause a radially outer portion of the elastic top wall 14 of the lid 14 to contact an outer peripheral portion 24O of the annular brim 24 and to locate any spilled product 306 extant on the upwardly facing surface 24U of the annular brim 24 under a downwardly facing surface 323I of the elastic top wall 14T of the lid 14 as suggested in FIGS. 8A-8D.

The process further comprises the step of stretching the elastic top wall 14T of lid 14 in radially outward directions during further downward movement of lid 14 relative to brim 24 of container 12 as suggested in FIGS. 9A-9C to move substantially all of the spilled product 306 extant on the upwardly facing surface 24U of the annular brim 24 in a radially inward direction past an inner peripheral portion of annular brim 24 into the interior product-storage region 26 formed in container 12 and cause substantially all of the upwardly facing surface 24U of annular brim 24 to be free of spilled product 306 and to mate with a confronting companion portion of the downwardly facing surface 323I of elastic top wall 14T of lid 14 therebetween so that substantially all of the spilled product 306 formerly extant on the upwardly facing surface 24U of annular brim 24 is wiped away as suggested in FIG. 10. Container 12 has an annular brim 24 arranged to surround an opening 27 into an interior product-storage region 26 formed in the container 12. Annular brim 24 includes an inner peripheral portion 24I bounding the opening 27, an outer peripheral portion 24O surrounding the inner peripheral portion 24I, and an upwardly facing surface 24U lying between and interconnecting the inner and outer peripheral portions 24I, 24O as suggested in FIGS. 7 and 8A.

The process further comprises the step of heating elastic top wall 14T of lid 14 to establish a chemical-bond sealed connection 101 between elastic top wall 14T of lid 14 and upwardly facing surface 24U of annular brim 24 of container 12 as suggested in STEP 5 of FIG. 1 and in FIG. 10. Heat 220H in excess of a selected temperature is applied to elastic top wall 14T of lid 14 during the heating step to cause any residual spilled product 3063 located on the upwardly facing surface 24U of annular brim 24 in a space provided between elastic top wall 14T of lid 14 and annular brim 24 of container 12 after the stretching step to be gasified and pass as a gas 306G from the space through elastic top wall 14T of lid 14 into the surroundings so that no spilled product remains on annular brim 24 of container 12 as suggested in FIG. 10.

Outer peripheral portion 24O of the annular brim 24 has an annular convex rounded shape as shown, for example, in FIGS. 8A-8D. The radially outer portion of elastic top wall 14T of lid 14 is deformed during the stretching step to mate with and move on outer peripheral portion 24O of annular brim 24 without piercing the elastic top wall 14T as lid 14 continues to move downwardly relative to container 12. A radially inwardly moving squeegeing action takes place along the upwardly facing surface 24U of annular brim 24 and from outer peripheral portion 24O of annular brim 24 toward inner peripheral portion 24I of annular brim 24 to wipe substantially all of the spilled product 306 extant on the upwardly facing surface 24U of annular brim 24 in a radially inward direction into the interior product-storage region 26 during movement of the radially outer portion of the elastic top wall 14T of lid 14 on outer peripheral portion 24O of annular brim 24 during the stretching step. Acute angle θ having an apex A on the peripheral portion of the annular brim 24 and established between the upwardly facing surface 24U of annular brim 24 and downwardly facing surface 323I of elastic top wall 14T of lid 14 is decreased substantially to zero as suggested in FIGS. 9A-9C and FIG. 10 during the stretching step to cause downwardly facing surface 323I of elastic top wall 14T of lid 14 to mate in stages in a radially inwardly directed rolling motion with the upwardly facing surface 24U of annular brim 24.

Lid 14 includes a sheet-support ring 30 and a membrane sheet 32 made of the elastic material. Sheet-support ring 30 is configured to surround annular brim 24 during the stretching step. Membrane sheet 32 has an outer surface 321O coupled permanently to sheet-support ring 30 to form lid 14 and an inner surface 323I arranged to face away from outer surface 321O and define the downwardly facing surface 323I of elastic top wall 14T of lid 14.

The process further comprises the step of heating the membrane sheet 32 using a heater 224 after the stretching step as suggested in FIGS. 1 and 10. The inner surface 323I of membrane sheet 32 is configured to provide means for chemically bonding with the upwardly facing surface 24U of annular brim 24 during the heating step, separating from the upwardly facing surface 24U of annular brim 24 in response to application of an external peeling force to membrane sheet 32 to disengage lid 14 from annular brim 24 of container 12, and mating temporarily and repeatedly with the upwardly facing surface 24U of annular brim 24 of container 12 to close the opening 27 into the interior product-storage region 26 formed in container 12 each time lid 14 is coupled to container 12 by a consumer so that any product 304 stored in the interior product-storage region 26 is retained in a sealed chamber 100 defined by container 12 and lid 14 as suggested in FIG. 2C.

Sheet-support ring 30 includes an annular band 30B having a top surface 30T and an annular lid-retention lug 30L appended to annular band 20B below the top surface 30T and arranged to lie under annular brim 24 of container 12 when lid 14 is coupled to container 12. Membrane sheet 32 includes a center portion 32P arranged to provide top wall 14T of lid 14 and lie above the opening 27 into the interior product-storage region 26 and above the upwardly facing portion 24U of annular brim 24. Membrane sheet 32 further includes an endless portion 32R arranged to surround center portion 32P and move on outer peripheral portion 24O of the annular brim 24 during the stretching step and to mate permanently with the sheet-support ring 30.

The endless portion 32R of the membrane sheet 32 includes a radially outwardly facing annular concave surface mating with the annular lid-retention lug 30L. As suggested in FIG. 10, endless outer portion 32R of membrane sheet 32 comprises, in sequence, a frustoconical segment 132 coupled to center portion 32P of membrane sheet 32, a cylinder-shaped segment 232 coupled to annular band 30B, a first convex annular segment 332 coupled to annular lid-retention lug 30L, a concave annular segment 432 coupled to annular lid-retention lug 30L, and a second convex annular segment 532 coupled to annular lid-retention lug 30L. It is within the scope of the present disclosure to provide segment 132 with a more rounded shape as shown, for example, in FIG. 5A.

Annular band 30B of sheet-support ring 30 further includes an upper interior wall 34W located between the top surface 30T and the annular lid-retention lug 30L and a lower interior wall 36W arranged to lie below and in spaced-apart relation to the upper interior wall 34W to locate the annular lid-retention lug 30L therebetween as suggested in FIG. 5B. The endless portion 32R of the membrane sheet 32 further includes a radially outwardly facing upper surface mating with upper interior wall 34W of annular band 30B and a radially outwardly facing lower surface mating with lower interior wall 36W of annular band 30B. A portion of the radially outwardly facing upper surface of annular band 30B associated with the top surface 30T of annular band 30B is arranged to surround the center portion 32P of membrane sheet 32 without contacting membrane sheet 32 to form an upwardly opening annular channel 400 between annular band 30B and a portion of outer surface 321O of membrane sheet 32 as shown, for example, in FIGS. 6 and 7.

Membrane sheet 32 is a multi-layer component comprising an outer bed 321 providing the outer surface 321O, an inner bed 323 providing the inner surface 323I, and a core 322 interposed between and coupled to the outer and inner beds 321, 323. Each of the outer bed 321, core 322, and inner bed 323 is made of a different material. Inner bed 323 includes metalized low-density polyethylene, polypropylene-based sealant, blends of polypropylene and polybutane, as well as EMA-EVA-based sealants. Inner bed 323 is made of a composition configured to establish a fluid seal every time the lid 14 is coupled with the annular brim 24 of the container 12 after the lid 14 is first removed from the container.

A process is provided for coupling a lid 14 to a brim 24 of a container 12 to close an opening 27 into an interior product-storage region 26 formed in the container 12 as suggested in FIG. 1. The process comprises the steps of filling an interior product-storage region 26 formed in a container 12 with product 304, placing a lid 14 on the brim 24 of the container 12 to cover an opening 27 into the interior product-storage region 26, moving a sealing head 220 downwardly toward a container 12 received in a container-receiving support fixture 210 to apply downwardly directed force 220F to the lid 14 while the lid 14 is on the brim 24 of the container 12 to couple the lid 14 mechanically to the brim 24 and to move a top wall 14T of the lid 14 laterally relative to the brim 14 to wipe any spilled product 306 off the brim 24 while the lid 14 remains coupled to the brim 24, and using a heater 224 associated with the sealing head 220 to apply heat 220H to the top wall 14T of the lid 14 while the lid 14 remains mechanically coupled to the brim 24 to establish a chemical-bond sealed connection 101 between the top wall 14T of the lid 14 and the brim 24 of the container 12.

The heater 224 is operated to apply heat 220H in excess of a selected temperature to the top wall 14T of the lid 14 to cause any residual spilled product 306 located on the brim 24 after the moving step to be gasified and pass as a gas 306G through the top wall 14T of the lid 14 to the surroundings. The lid 14 includes a side wall 14S defined by a sheet-support ring 30. The top wall 14T is defined by a membrane sheet 32 made of an elastic material. Membrane sheet 32 has an outer surface 321O coupled permanently to the sheet-support ring 30 to form the lid 14 and an inner surface 323I arranged to face away from the outer surface 321O and toward the annular brim 24. Sheet-support ring 30 includes an annular band 30B having a top surface 30T and an annular lid-retention lug 30L appended to the annular band 30B below the top surface 30T and arranged to lie under the annular brim 24 of the container 12 when the lid 14 is coupled to the container 12. Membrane sheet 32 includes a center portion 32P arranged to provide the top wall 14T of the lid 14 and lie above the opening 27 into the interior product-storage region 26 and above the upwardly facing portion 24U of the annular brim 24. Membrane sheet 32 further includes an endless portion 32R arranged to surround the center portion 32P and move on the outer peripheral portion 24O of annular brim 24 during the stretching step and to mate permanently with the sheet-support ring 30.

In illustrative embodiments, sheet-support ring 30 has an endless (e.g., round, ring-shaped, square, oblong, etc.) edge shaped to mate with a companion container 12. Sheet-support ring 30 may be thermoformed or otherwise molded of a suitable plastics material. Suitable materials include polypropylene (PP) or high-density polyethylene (HDPE). Sheet-support ring 30 may also be made of polyethylene terephthalate (PET) or crystallized polyethylene terephthalate (CPET) to improve barrier properties. Sheet-support ring 30 may also be made using a coextruded material with barrier polymers such as EVOH or PVdC in a center layer.

In illustrative embodiments, multi-layer membrane sheet 32 can be produced using a coextruded film or sheet product comprising, for example, PP or HDPE. Membrane sheet 32 may also include one or more barrier layers such as EVHO, NYLON, or PVdC, tie layers, and a sealant layer. The sealant layer may comprise metalized LDPE or LLDPE, PP-based sealant, blends of PP and polybutane, as well as EMA- and EVA-based sealants.

It is unnecessary to attach a separate closure film or foil to the container on the filling line after container 12 has been filled and before lid 14 is mounted on container 12 when using a lid 14 in accordance with the present disclosure owing, in part, to the provision of a peelable and resealable sealant layer 323 in the lid 14 disclosed herein. Packaging cost and complexity is thus minimized and the customer is provided with an easy-to-use product that is characterized by sustainability. The peelable and releasable sealant layer is peelable and resealable.

A package in accordance with the present disclosure is well-suited for use in hot-filled non-barrier containers. It may also be used in barrier, retortable containers. Sustainability is enhanced because the lid is made of like materials without the inclusion of metal rings or other non-plastics materials in illustrative embodiments.

A package 10 in accordance with the present disclosure includes a container 12 and a lid 14 as suggested in FIGS. 1-4. Container 12 is formed to include a product-storage region 26 and a brim 24 bordering an opening 27 into product-storage region 26 as suggested in FIGS. 2A and 2B. Lid 14 is adapted to mate with brim 24 of container 12 to close the opening 27 into product-storage region 26 formed in container 12 as suggested in FIG. 3.

Lid 14 includes a sheet-support ring 30 and a membrane sheet 32 as suggested in FIGS. 4, 5A, and 5B. Membrane sheet 32 is coupled permanently to sheet-support ring 30 to move therewith relative to container 12 as suggested in FIG. 6.

Sheet-support ring 30 is configured to mate with brim 24 of container 12 when lid 14 is mounted on container 12 to extend around the opening 27 into product-storage region 26 as suggested in FIGS. 1-4. Sheet-support ring 30 also is configured to include an inwardly facing wall 34W arranged to face toward brim 24 of container 12 as suggested in FIGS. 5B, 6, and 7.

Membrane sheet 32 has an outer surface 321O coupled permanently to sheet-support ring 30 to form lid 14 as suggested in FIGS. 4 and 6. Membrane sheet 32 also includes an inner surface 323I configured to provide means for mating temporarily and repeatedly with brim 24 of container 12 to close the opening 27 into product-storage region 26 and establish a sealed connection between membrane sheet 32 and brim 24 of container 12 each time sheet-support ring 30 of lid 14 is mated with brim 24 of container 12 so that any product 304 stored in product-storage chamber 26 is retained in a sealed chamber 100 defined by container 12 and lid 14 as suggested in FIGS. 2C and 3.

Sheet-support ring 30 includes an exterior surface 30E facing away from brim 24 of container 12 and an interior surface 30I facing toward brim 24 of container 12 and lying between exterior surface 30E and brim 24 of container 12 as suggested in FIG. 5B. Interior surface 30I includes inwardly facing wall 34W and annular edge-support surface 34S. Inwardly facing wall 34W has a concave shape as suggested in FIG. 5B.

Figure 2A:
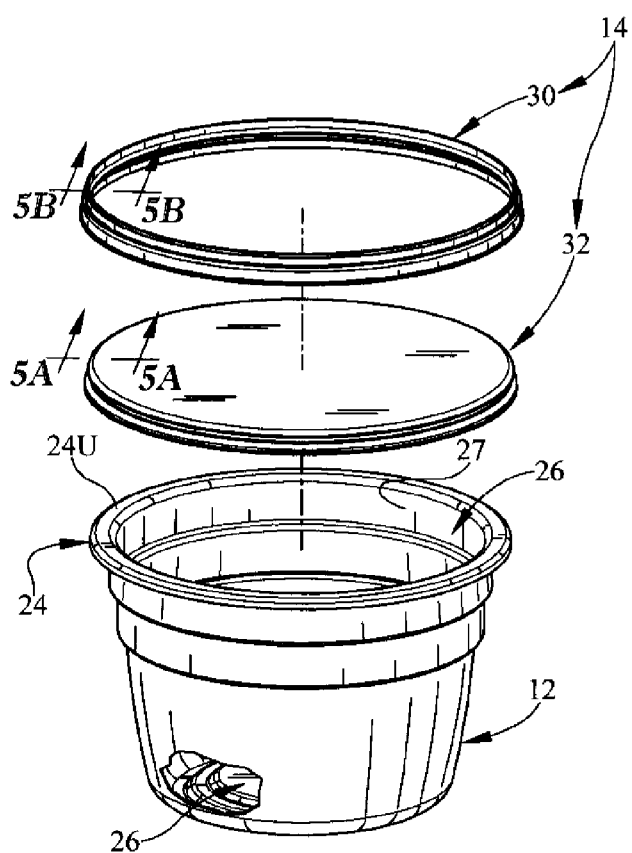
FIG. 2A is an enlarged perspective view of the container of FIG. 1 before the lid is assembled and then coupled to a brim included in the container to close an opening into a product-storage region formed in the container and showing that the lid includes an annular sheet-support ring and a round membrane sheet.
Figure 2C:
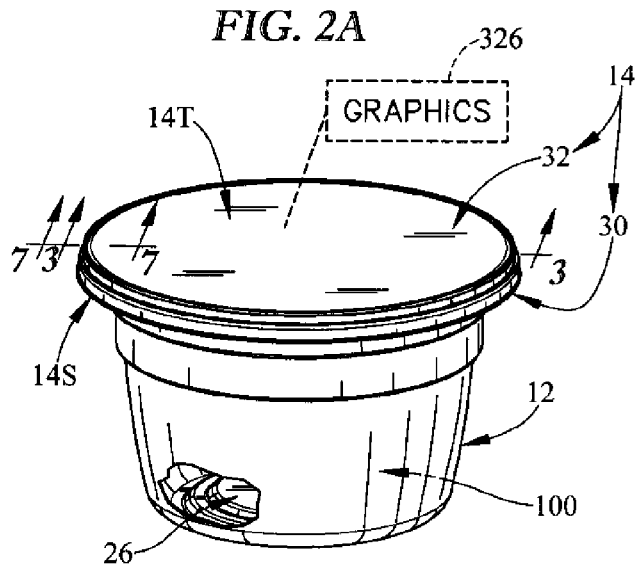
FIG. 2C is a perspective view of a package in accordance with the present disclosure and showing that the package includes a container and a lid coupled to the container and made of a membrane sheet and a surrounding sheet-support ring as suggested in FIGS. 2A, 2B, and 6.
Figure 2B:
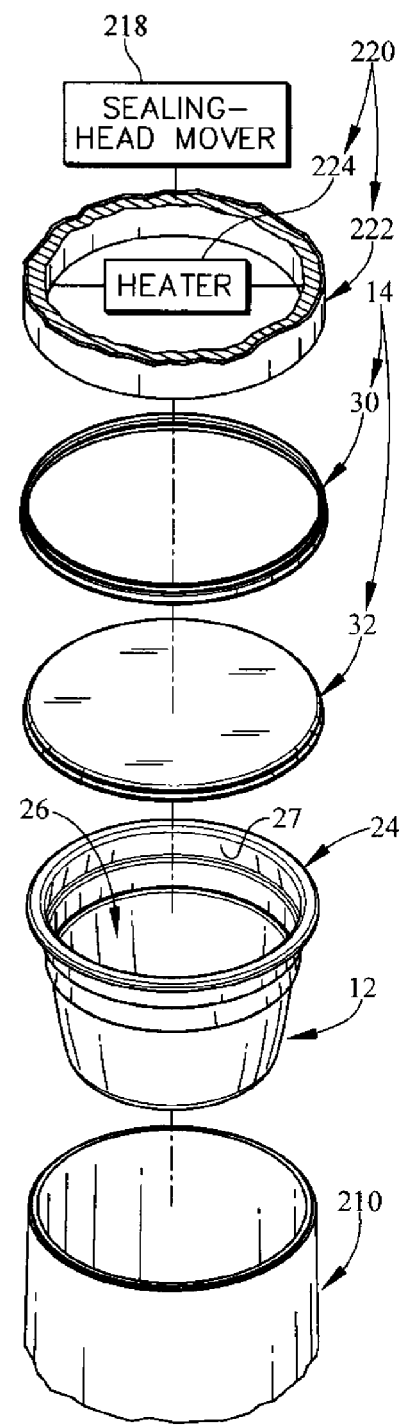
FIG. 2B is an exploded perspective assembly view showing (from bottom to top) a portion of a container-receiving support fixture provided in a container filling and closing line at a factory, a container having a brim, a round membrane sheet and an annular sheet-support ring that cooperate when assembled to produce the container lid, a movable sealing head including an illustrative annular lid mover and a diagrammatic lid heater coupled to the annular lid mover, and a diagrammatic sealing-head mover also provided in the container filling and closing line at the factory and configured to provide means for moving the movable sealing head downwardly toward the container-receiving support fixture to engage the lid while the lid rests on the brim of a container received in the container-receiving support fixture.

Outer surface 32IO of membrane sheet 32 includes a center portion 31 and an endless portion 33 as suggested in FIGS. 2A and 6. Center portion 31 is arranged to lie above the opening 27 into the product-storage region 26 when lid 14 is mounted on container 12 as suggested in FIGS. 4 and 7. Endless portion 33 is coupled to and arranged to surround center portion 31 as suggested in FIG. 5A. Endless portion 33 of outer surface 32IO of membrane sheet 32 has a shape that is arranged to mate with interior surface 30I of sheet-support ring 30 as suggested in FIGS. 4, 6, and 7. Center portion 31 is round and endless portion 33 is ring-shaped in an illustrative embodiment as suggested in FIG. 2A.

Sheet-support ring 30 includes a top surface 30T arranged to lie above brim 24 of container 12 when lid 14 is mounted on container 12 as suggested in FIGS. 4 and 7. Outer surface 32IO of center portion 31 is arranged to lie in a space provided between top surface 30T and inwardly facing wall 34W of sheet-support ring 30 as suggested in FIGS. 6 and 7.

Sheet-support ring 30 includes an annular band 30B having a top surface 30T and an annular lid-retention lug 30L appended to annular band 30B at a point below top surface 30T as suggested in FIGS. 5B, 6, and 7. Annular lid-retention lug 30L is arranged to lie under brim 24 of container 12 when lid 14 is mounted on container 12 to provide means for trapping a section of membrane sheet 32 between annular lid-retention lug 30L and brim 24 of container 12 to block removal of lid 14 from a mounted position on container 12 as suggested in FIGS. 4 and 7. Center portion 31 of outer surface 32IO of membrane sheet 32 lies below top surface 30T of annular band 30B and above annular lid-retention lug 30L as suggested in FIGS. 6 and 7.

Membrane sheet 32 is a multi-layer component comprising an outer bed 321 providing the outer surface 32IO, an inner bed 323 providing the inner surface 323I, and a core 322 interposed between and coupled to outer and inner beds 321, 323. Each of outer bed, core, and inner bed 321-323 is made of a different material in an illustrative embodiment.

Membrane sheet 32 includes a center plate 32P and an outer rim 32R as suggested in FIGS. 5A, 6, and 7. Center plate 32P is arranged to mate with brim 24 of container 12 and close the opening 27 into product-storage region 26 when lid 14 is mounted on container 12. Outer rim 32R is coupled to and arranged to extend around center plate 32P. Center plate 32P is round and rim 32R is ring-shaped. Outer surface 32IO of center plate 32P lies below top surface 30T of annular band 32B and above annular lid-retention lug 30L.

Sheet-support ring 30 may have any suitable rigid or semi-rigid character or any suitable round or non-round shape in accordance with the present disclosure. Shell-support ring 30 includes a lid-retention lug 30L or any suitable bead or engagement means for mating with container brim 24 during a capping process to mount lid 14 on container 12 and also during a repeated lid reclosure process carried out by consumers after the lid 14 is removed the first time to open the package 10. Sheet-support ring 30 also provides a structure for the consumer to push against during the lid reclosure process. Shell-support ring 30 is made of a material characterized by high-temperature stability in illustrative embodiments.

Membrane sheet 32 is a multi-layer film that is bonded to sheet-support ring 30 during an insert-molding process in an illustrative embodiment. An aggressive bond is established to mate membrane sheet 32 permanently to sheet-support ring 30.

Membrane sheet 32 is stretched tightly to mate with container brim 24 whenever lid 14 is mounted on container 12 in illustrative embodiments. Membrane sheet 32 functions to wipe container brim 24 free of contaminants during capping and lid reclosure as shown, for example, in FIGS. 9A-9C.

Membrane sheet 32 is flexible and configured to move, deform, and conform in response to changes in pressure extant in the sealed chamber 100 formed in package 10. Membrane sheet 32 is peelable to facilitate disengagement from container brim 24 during removal of lid 14 from container 12.

Membrane sheet 32 is made of a material characterized by stiffness, high temperature stability, high puncture resistance, and high burst strength. Membrane sheet 32 provides a barrier to a fluid material such as liquid, oxygen, moisture, and solids.

It is within the scope of the present disclosure to bond membrane sheet 32 to sheet-support ring 30 during a ring-molding process (in-mold label, IML technology). Membrane sheet 32 is formable during a molding or capping process using heat and pressure.

It is within the scope of the present disclosure to configure membrane sheet 32 to provide one or more of the following tamper-evident indicators: (1) tamper evident through tactile feel of resistance while removing lid 14 from container; (2) tamper evident through discoloration due to delamination of inner be 323 providing peelable and resealable sealant layer; and (3) tamper evident through discoloration due to stretching/permanent deformation of one or more of layers 321, 322, 323.

In illustrative embodiments, multi-layer membrane sheet 32 is bonded permanently to shell-support ring 30 through material adhesion. The film comprising membrane sheet 32 is formed, for example, during an insert molding process. This encapsulates outer rim 32 R forming a smooth surface and forming a mechanical bond. Sheet-support ring 30 is higher than membrane sheet 32 as suggested in the drawings to pull membrane sheet 32 tight while capping and sealing so as to accelerate bonding of film sealing layer 323 to container brim 24 and to stretch all layers 321-323 across container brim 24.

A package 110 in accordance with another embodiment of the disclosure is illustrated in FIGS. 11-13. Package 110 includes a container 12 and a lid 114 comprising a sheet-support ring 30 and a membrane sheet 132. Membrane sheet 132 is formed to include a concave center portion 132C surrounded by container brim 24. Lid 114 includes a top wall 114T and a side wall 114S depending from a peripheral portion of top wall 114T.

Top wall 114T of lid 114 is adapted to be moved by movable sealing head 220 in a container filling and closing process as suggested in a manner similar to that shown in FIGS. 9A-9C to wipe any spilled product 306 that was inadvertently deposited on container brim 24 during filling of container 12. Top wall 114T is heated using heater 224 to establish a chemical-bond sealed connection 101 between top wall 114T of lid 114 and container brim 24 as suggested in FIG. 10. The applied heat is also high enough to cause any minute quantity of residual spilled product 306 extant on container brim 24 to be gasified and pass as a gas 306G through top wall 114T of lid 114 into the surroundings.

The invention claimed is:

1. A process for coupling a lid to a brim of a container to close an opening into an interior product-storage region formed in the container, the process comprising the steps of
providing a lid having an elastic top wall made of an elastic material and a container having an annular brim arranged to surround an opening into an interior product-storage region formed in the container, wherein the annular brim includes an inner peripheral surface bounding the opening, an outer peripheral surface surrounding the inner peripheral surface, and an upwardly facing surface lying between and interconnecting the inner and outer peripheral surfaces,
moving the elastic top wall of the lid downwardly toward the annular brim of the container to cause a portion of the lid to contact the upwardly facing surface of the annular brim and to locate any spilled product extant on the upwardly facing surface of the annular brim under a downwardly facing surface of the elastic top wall of the lid, and
stretching the elastic top wall of the lid relative to the annular brim during further movement of the lid relative to the annular brim of the container to move a portion of the spilled product extant on the upwardly facing surface of the annular brim in a radially inward direction toward and into the interior product-storage region and a remaining portion of the spilled product extant on the upwardly facing surface of the annular brim in a radially outward direction away from the interior product-storage region and into a radially outer space provided between the lid and the outer peripheral surface of the annular brim to cause substantially all of the spilled product extant on the upwardly facing surface of the annular brim to be free of spilled product and to mate with a confronting companion surface of the downwardly facing surface of the elastic top wall of the lid therebetween so that substantially all of the spilled product formerly extant on the upwardly facing surface of the annular brim is wiped away,
wherein the lid includes a sheet-support ring having a hollow center portion and a membrane sheet made of the elastic material, the sheet-support ring surrounds the annular brim during the stretching step, the membrane sheet has an outer surface coupled permanently to the sheet-support ring prior to the stretching step to form the lid and an inner surface arranged to face away from the outer surface and comprise the downwardly facing surface of the elastic top wall of the lid.

2. The process of claim 1, wherein the outer peripheral surface of the annular brim has an annular convex rounded shape and the radially outer surface of the elastic top wall of the lid is deformed during the stretching step to mate with and move on the outer peripheral surface of the annular brim without piercing the elastic top wall as the lid continues to move downwardly relative to the container.

3. The process of claim 2, wherein a radially inwardly moving squeegeing action takes place along the upwardly facing surface of the annular brim and from the outer peripheral surface of the annular brim toward the inner peripheral surface of the annular brim to wipe substantially all of the spilled product extant on the upwardly facing surface of the annular brim in a radially inward direction into the interior product-storage region during movement of the radially outer surface of the elastic top wall of the lid on the outer peripheral surface of the annular brim during the stretching step.

4. The process of claim 2, wherein an acute angle having an apex on the peripheral surface of the annular brim and established between the upwardly facing surface of the annular brim and the downwardly facing surface of the elastic top of the lid is decreased substantially to zero during the stretching step to cause the downwardly facing surface of the elastic top of the lid to mate in stages in a radially inwardly directed rolling motion with the upwardly facing surface of the annular brim.

5. The process of claim 1, further comprising the step of heating the membrane sheet after the stretching step and wherein the inner surface of the membrane sheet is configured to provide means for chemically bonding with the upwardly facing surface of the annular brim during the heating step, separating from the upwardly facing surface of the annular brim in response to application of an external peeling force to the membrane sheet to disengage the lid from the annular brim of the container, and mating temporarily and repeatedly with the upwardly facing surface of the annular brim of the container to close the opening into the interior product-storage region formed in the container each time the lid is coupled to the container by a consumer so that any product stored in the interior product-storage region is retained in a sealed chamber defined by the container and the lid.

6. The process of claim 1, wherein the sheet-support ring includes an annular band having a top surface and an annular lid-retention lug appended to the annular band below the top surface and arranged to lie under the annular brim of the container when the lid is coupled to the container, the membrane sheet includes a center portion arranged to provide the top wall of the lid and lie above the opening into the interior product-storage region and above the upwardly facing portion of the annular brim, and the membrane sheet further includes an endless portion arranged to surround the center portion and move on the outer peripheral portion of the annular brim during the stretching step and to mate permanently with the sheet-support ring.

7. The process of claim 6, wherein the endless outer portion of the membrane sheet comprises, in sequence, a frustoconical segment coupled to the center portion of the membrane sheet, a cylinder-shaped segment coupled to the annular band, a first convex annular segment coupled to the annular lid-retention lug, a concave annular segment coupled to the annular lid-retention lug, and a second convex annular segment coupled to the annular lid-retention lug.

8. The process of claim 6, wherein the endless portion of the membrane sheet includes a radially outwardly facing annular concave surface mating with the annular lid-retention lug.

9. The process of claim 8, wherein the annular band further includes an upper interior wall located between the top surface and the annular lid-retention lug and a lower interior wall arranged to lie below and in spaced-apart relation to the upper interior wall to locate the annular lid-retention lug therebetween, the endless portion of the membrane sheet further includes a radially outwardly facing upper surface mating with the upper interior wall of the annular band and a radially outwardly facing lower surface mating with the lower interior wall of the annular band.

10. The process of claim 9, wherein a portion of the radially outwardly facing upper surface of the annular band associated with the top surface of the annular band is arranged to surround the center portion of the membrane sheet without contacting the membrane sheet to form an upwardly opening annular channel between the annular band and a portion of the outer surface of the membrane sheet.

11. The process of claim 1, wherein the membrane sheet is a multi-layer component comprising an outer bed providing the outer surface, an inner bed providing the inner surface, and a core interposed between and coupled to the outer and inner beds and wherein each of the outer bed, core, and inner bed is made of a different material.

12. The process of claim 11, wherein the inner bed includes metalized low-density polyethylene, polypropylene-based sealant, blends of polypropylene and polybutane, as well as EMA-EVA-based sealants.

13. The process of claim 11, wherein the inner bed is made of a composition configured to establish a fluid seal every time the lid is coupled with the annular brim of the container after the lid is first removed from the container.

14. The process of claim 1, further comprising the step of heating the elastic top wall of the lid to establish a chemical-bond sealing connection between the elastic top wall of the lid and the upwardly facing surface of the annular brim of the container.

15. The process of claim 14, wherein heat in excess of a selected temperature is applied to the elastic top wall of the lid during the heating step to cause any residual spilled product located on the upwardly annular brim in a space provided between the elastic top wall of the lid and the annular brim of the container after the stretching step to be gasified and pass as a gas from the space through the elastic top wall of the lid into the surroundings so that no spilled product remains on the annular brim of the container.

* * * * *